May 25, 1937. M. MADSEN 2,081,379
ANIMAL SNARING DEVICE
Filed Oct. 22, 1934 2 Sheets-Sheet 1
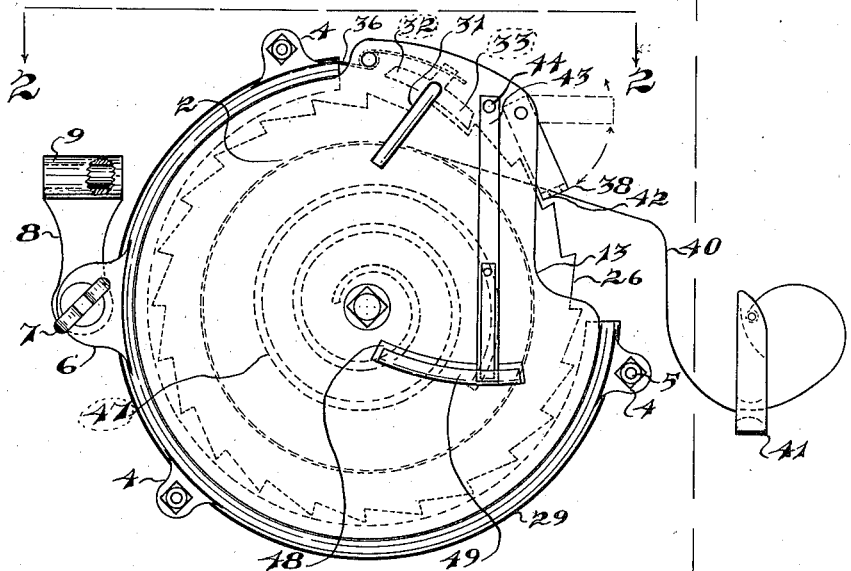
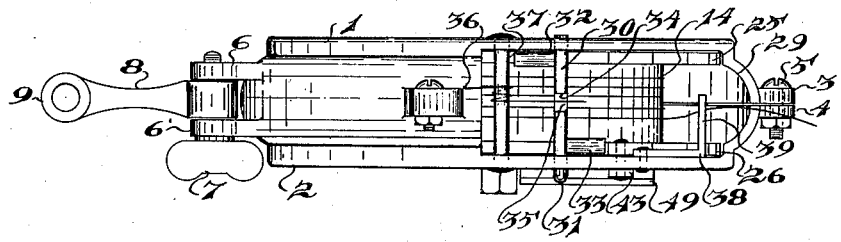
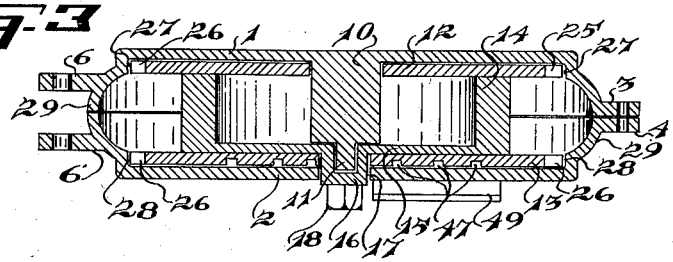
Inventor:
Marius Madsen
Per
Leland J. Mitchell
A. L. Horney.

May 25, 1937. M. MADSEN 2,081,379
ANIMAL SNARING DEVICE
Filed Oct. 22, 1934 2 Sheets-Sheet 2
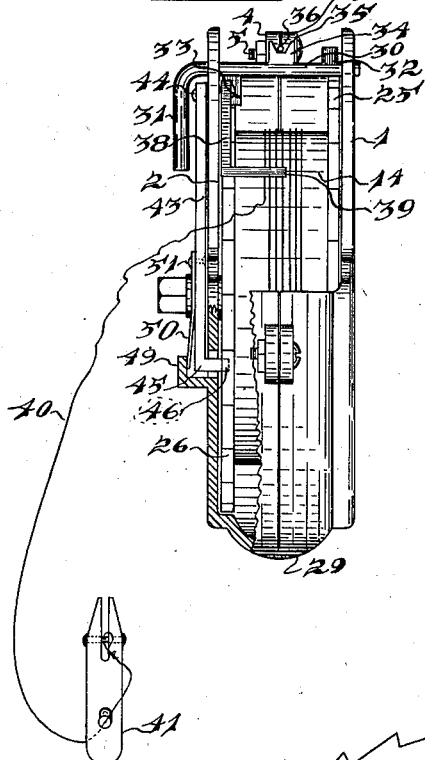
Inventor:
Marinus Madsen
Per
Leland S. Mitchell
Attorney.

Patented May 25, 1937

2,081,379

UNITED STATES PATENT OFFICE 2,081,379

ANIMAL SNARING DEVICE

Marius Madsen, Winnipeg, Manitoba, Canada, assignor to Madsen Humane Trap Co. Limited, Toronto, Canada Application October 22, 1934, Serial No. 749,346

5 Claims. (Cl. 43—87)

My invention relates to animal snaring devices, more particularly having reference to improved anchoring means for snares of a type employing a draw string with constricting noose.

In the use of animal snares of a character employing a constricting noose, considerable suffering of the animal inevitably results before it can be destroyed, and an object of the present invention is to provide an improved anchoring device for snares of this character embodying a winding drum with spring tension means by which any slack occurring in the draw string portion of the snare, after ensnarement of the animal, may be effectively taken up, resulting in ultimate strangulation of the animal.

My snare anchoring device includes an improved casing for the winding drum by which the draw string is compelled to ride in a prescribed channel without liability of entanglement. There is also provided improved trigger and dogging mechanism arranged to oppose a fixed resistance to the pull of the animal without imposing any strain on the spring providing the power for taking up slack in the draw string, and for initiating operation of said spring on ensnarement of the animal.

The device further provides means for automatic disengagement of the power spring when tightened beyond its normal limits, and also provides means for imposing a limitation on the unwinding operation of the spring.

Other features and advantages of my invention will become apparent from the accompanying description taken in conjunction with the drawings in which:

Fig. 1 is a side view of the device assembled.

Fig. 2 is a top view of same illustrated as viewed from the line 2—2 of Figure 1.

Fig. 3 is a view in horizontal section of the casing and winding drum.

Fig. 4 is a front view of the device assembled taken from the line 4—4 of Figure 1, certain parts being in section.

Figs. 5 and 6 are detail plan and side views respectively of the spring stop arm.

Fig. 7 is a side view partly broken away of the winding drum.

Having reference to the drawings there is provided a casing formed of mating halves 1 and 2, said halves providing at intervals coinciding flanges 3 and 4 bored for reception of bolts 5.

The casing halves are further formed with integral opposing lugs 6 and 6', said lugs being laterally bored and threaded for reception of a winged bolt 7 engaging a bracket 8, said bracket having a cylindrical end portion 9 suitable for engagement of a spike or pin to be driven into a fixed support such as a tree.

The side wall of the casing half 1 is formed with an integral hub 10, said hub providing a terminal reduced portion 11.

Mounted to rotate on the hub 10 is a winding drum in the form of a hollow body made up of parts connected to form a unitary structure. Said body includes side walls 12 and 13 spaced apart by a peripheral wall 14, said wall 14 including an integral side plate 15 providing a bearing cap 16. The walls 13 and 2 provide suitable openings as indicated at 17 for the cap 16. The cap 16 terminates in a head 18, said head being squared suitable for engagement of a wrench, pliers or other tool by which the drum may be rotated for winding purposes.

Within the winding drum is mounted a spiral spring 19. The inner end of said spring is bent to provide a hook member 20 engageable in a transverse slot 21 formed in the hub 10. Said slot 21 provides a sloping rear wall as indicated at 22 whereby excessive tension on the spring 19 may cause the hook member 20 to disengage from the slot 21 through a momentary partial straightening of said hook member, it being readily understood that re-engagement of said hook member would be automatic on rotation of the drum.

The outer end of spring 19 is bent to provide a hook member 23 engageable in a slot 24 formed in the inner face of the peripheral wall 14, said slot being directed similarly to the slot 21 permitting similar automatic disengagement and engagement of the hook member 23.

The peripheral portions of the side walls 12 and 13 provide ratchet teeth, respectively indicated at 25 and 26, formed suitable for engagement of relatively fixed pawls as hereinafter described.

The winding drum is intended to have wound thereon the draw string portion of the animal snare. To prevent entanglement of said draw string with the ratchet teeth, the casing halves 1 and 2 are formed with annular shoulders 27 and 28 forming guards for said ratchet teeth. The casing further includes an arcuate peripheral portion referred to by the numeral 29 allowing for the normal bulge resultant from winding the draw string on the winding drum.

The winding drum is intended to be secured against rotation in either direction as required for which purpose the ratchet teeth are provided on the drum side walls 12 and 13, it being noted that said teeth are oppositely directed for the respective walls.

Transversely mounted in the side walls 1 and 2 is a bent pin including a shank portion 30 rotatable in suitable openings in said walls and a handle portion 31 by which said shank may be rotated. On the shank 30 are oppositely directed pawls 32 and 33 respectively engageable with the ratchet teeth 25 and 26.

One only of the pawls 32 and 33 is engageable at a time with associated ratchet teeth or both pawls may simultaneously be held in a neutral position.

The shank 30 includes a lug 34 with recess 35 providing a relatively flat bottom portion, said recess forming a seat for a spring 36 secured to a pin 37 transversely secured in the walls 1 and 2. Said spring 36 is tensioned to apply a pressure on the shank 30 sufficient to hold the shank normally neutrally disposed relative to engagement of the pawls 32 and 33, or partially turned with one or other of said pawls engaged with the ratchet teeth on the winding drum.

Pivoted on the side wall 2 is a trigger 38 providing a lateral arm 39 in which is formed an eye suitable for passage of a draw string 40 forming part of a snare of which 41 indicates the runner for formation of the constricting noose by which the animal is ensnared, the other end of the draw string being attached to the winding drum.

The angular portion of the trigger 38 formed at the junction of the lateral arm 39, provides a nose, more particularly indicated at 42, said nose being engageable with the ratchet teeth 26 by which the drum may be held against unwinding.

In event of the trigger 38 being released from the ratchet teeth without engagement of the noose on an animal to impose a restriction on the winding operation of the winding drum, the runner 41 would be drawn into the trigger and pawl mechanism with probable injury resulting. For this and similar reasons, a limitation is imposed on the operation of the winding drum in the form of a mechanical stop automatically engageable at the conclusion of a predetermined unwinding operation.

The stop includes an arm 43 secured at 44 to the casing wall 2. The free end of said arm is formed with an angular portion 45 providing a stud 46 engageable in a spiral groove 47 in the side wall 13 of the winding drum, the wall 2 providing a slot 48 in which the angular portion 45 is movable.

The casing wall 2 includes an integral bent flange 49 formed with part overlying the slot 48 throughout its length (see Figure 4). On the arm 43 is a spring 50 having one end secured at 51 to said arm, and the other end engaged by the flange 49, said spring being arranged to normally urge the arm 43 inwards and hold the stud 46 in the groove 47. In the unwinding of the drum when the stud 46 reaches the one end of the groove 47 it imposes a check to lock the drum against further unwinding movement.

To wind the spring 19 the winding drum is rotated in a clockwise direction, the pawl 33 being first depressed to engage the ratchet teeth 26 to prevent the spring from unwinding again. The trigger 38 can then be engaged with the ratchet teeth 26 and the pawl 33 disengaged. The pawl 32 is then depressed to engage the ratchet teeth 25 thus locking the winding drum against further winding. When so arranged the anchoring device is set or ready for use.

An animal ensnared by the noose, by jerking on the draw string 40, disengages the trigger 38 allowing the spring 19 to rotate the winding drum and wind the draw string thereon. Any jerking on the draw string by the ensnared animal is opposed by the fixed resistance provided by engagement of the pawl 32 with the ratchet teeth 25. Each successive jerk of the animal is followed by a slack in the draw string, this slack being taken up until the animal is strangled, it being understood that the anchoring device would be suspended above the ground Various changes in the form, proportion and the minor details of construction may be resorted to without departing from the principle or sacrificing any of the advantages of the invention as claimed

What I claim is:

1. In an animal snaring device including a casing and a spring operated drum in the casing on which the draw string of a noose is to be wound, said drum including an annular ratchet, a trigger pivoted in the casing, said trigger including a nose engageable with said ratchet and a lateral arm projecting transversely of the drum and through which the draw string may be passed whereby an actuation of the draw string may serve to disengage the nose of the trigger from the ratchet.

2. A winding device for the draw string of an animal snare including mating sections combinable to form a casing, one of said sections having an integral hub, said hub including a reduced end portion, and a drum mounted for rotation on said hub, one wall of said drum having a bearing cap for reception of the end portion of said hub, and the casing wall providing an opening for the reception of said cap.

3. An animal snaring device including a casing providing opposing side walls, one wall of said casing having an integral hub, a drum mounted for rotation on said hub, said drum including spaced side walls and a peripheral wall defining a channel for winding thereon the draw string of an animal snare, said side walls having oppositely toothed edges, pawl means engageable at will with one or the other of said toothed edges, a spring for rotation of the drum, and a trigger engageable with one of the toothed edges to prevent rotation of the drum by said spring.

4. In an animal snaring device including a casing and a spring operated drum mounted for rotation in the casing, said drum being adapted to have the draw string of an animal snare wound thereon and said drum including annular ratchets, pawl means engageable at will with said ratchets to secure the drum against rotation in either direction, and a trigger on the casing engageable with one of the ratchets to hold the drum against rotation by the spring, said trigger being associated with the draw string whereby actuation of the draw string serves to release the trigger.

5. In an animal snaring device including a casing and a spring operated drum on which a draw string is wound mounted for rotation in the casing, the side walls of said drum having their peripheral portions formed with oppositely directed teeth, pawl means in the casing engageable with said teeth, said means comprising a bent pin having a shank portion transversely mounted in the casing with oppositely directed pawls carried by the pin, and a trigger in the casing engageable with the teeth to hold the drum against rotation by the spring, said trigger including an eye for passage of the draw string.

MARIUS MADSEN.